United States Patent
Barbanson et al.

(10) Patent No.: US 7,627,886 B2
(45) Date of Patent: Dec. 1, 2009

(54) SYSTEMS AND METHODS FOR DISPLAYING VIDEO STREAMS

(75) Inventors: Monique Barbanson, Palo Alto, CA (US); Pradip K. Fatehpuria, Cupertino, CA (US); Hans Martin Krober, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1597 days.

(21) Appl. No.: 10/090,112

(22) Filed: Mar. 4, 2002

(65) Prior Publication Data
US 2003/0167472 A1 Sep. 4, 2003

(51) Int. Cl.
*H04N 7/173* (2006.01)
(52) U.S. Cl. .......................... 725/90; 725/96; 725/100; 725/131; 725/151
(58) Field of Classification Search .................... 725/90, 725/151, 131, 100, 96
See application file for complete search history.

(56) References Cited

U.S. PATENT DOCUMENTS

| | | | | |
|---|---|---|---|---|
| 6,014,694 A * | 1/2000 | Aharoni et al. | ............. | 709/219 |
| 6,076,111 A * | 6/2000 | Chiu et al. | ................. | 709/232 |
| 6,536,043 B1 * | 3/2003 | Guedalia | ..................... | 725/90 |
| 7,143,432 B1 * | 11/2006 | Brooks et al. | ............... | 725/105 |
| 2002/0009149 A1 * | 1/2002 | Rodriguez et al. | ..... | 375/240.25 |
| 2002/0010938 A1 * | 1/2002 | Zhang et al. | ................... | 725/95 |
| 2002/0065925 A1 * | 5/2002 | Kenyon et al. | .............. | 709/231 |

* cited by examiner

*Primary Examiner*—Christopher Kelley
*Assistant Examiner*—Timothy R Newlin
(74) *Attorney, Agent, or Firm*—Workman Nydegger

(57) ABSTRACT

Displaying a video stream when constrained by system memory and connection bandwidth. When the resources and/or memory of a client are insufficient to decode and process a video stream, the client only decodes and processes key frames of the video stream. The other frames are discarded by the client. By decoding and processing key frames, the memory and resource requirements of the video stream are reduced. The client is also able to negotiate with the video stream source such that only key frames are downloaded. Bandwidth limitations can thus be accommodated because downloading only key frames requires less bandwidth.

12 Claims, 4 Drawing Sheets

SYSTEMS AND METHODS FOR DISPLAYING VIDEO STREAMS

BACKGROUND OF THE INVENTION

1. The Field of the Invention

The present invention relates to displaying a video stream. More particularly, the present invention relates to systems, methods, and computer program products for displaying at least a portion of a video stream when the video stream is subject to bandwidth constraints and memory limitations.

2. Background and Relevant Art

The Internet is a resource that contains a vast amount of information in varying forms. Data can be stored and accessed, for example, as text, images, and streaming video. Each different kind of data has certain characteristics that affect how the data is downloaded and viewed. Text, for example, requires relatively little memory on a computer or other processing device and can be downloaded rather quickly even over slow network connections. Image data, in comparison with text data, is typically larger in size and will therefore require more time to download to the set top box. While the size of the image data does not preclude a user from downloading the image, the size of the image does affect the amount of time that is required to download the image. A user who has a slow network connection is simply required to wait. Once an image is downloaded, however, it can be easily displayed and connection bandwidth is no longer a concern for that image.

Video streams, however, are significantly different from text data and image data. Streaming video is a series of images that, when displayed in rapid succession, provide the illusion of movement. Because the images must be displayed in relatively rapid succession, the connection speed can have a significant impact on the ability of the computer to display the video stream. Currently, video streams are suppressed if the computer cannot maintain sufficient throughput with respect to the video stream. In other words, the ability of many computers to display video streams is limited by the speed of their connection with the video stream source.

In addition to being a series of images, video streams are usually compressed. A computer is therefore required to decompress the video stream before it can be displayed to a user. Decompressing and processing a video stream is not a simple process. Decompressing the video stream, for example, often requires the computer to perform complex operations such as an inverse discrete cosine transform (DCT) and an inverse quantization multiple times for each frame of the video stream. In addition, the computer is required to perform other processing, such as motion compensation, related to reconstructing some of the frames in the video stream.

In addition to the memory and processing power required to fully decode the video stream, the computer must create and manage various memory buffers that are used to store copies of various reference frames used to reconstruct other frames of the video stream. For example, a video stream such as a Moving Pictures Experts Group (MPEG) stream contains I frames, P frames, and B frames. B frames are bi-directional frames that can reference two separate frames that contain data required to decode the B frame. A P frame typically only references a single frame and only one memory buffer is required in this instance. The memory required to decompress and process B frames and P frames can consume a significant amount of memory and processing power. As the resolution of a video stream increases, more memory and/or resources of the computer are consumed. Thus, the ability of a computer to display a video stream is also limited by the available memory and processing power of the computer.

Because of these limitations, many computers are simply unable to access a significant amount of content, including video streams, that is otherwise available, for example, on the Internet. Many web sites, for instance, provide different versions of the same video stream and each version is geared towards a specific bandwidth. Video streams that can be accessed over connections with relatively low bandwidth typically have lower resolution and are of lower quality their counterparts. Computers with dial up connections are particularly susceptible to the bandwidth limitation.

Many computers are, therefore, unable to display video streams because of the connection speed or bandwidth of their network connection and because of the memory/resource limitations of the computer. In these instances, the video is suppressed by the computer and the user is unable to view these video streams.

SUMMARY OF THE INVENTION

The present invention recognizes the limitations of the prior art and the need for systems, methods, and computer program products that are able to display a video stream. More particularly, the present invention relates to systems, methods, and computer program products for displaying video streams that are subject to bandwidth constraints and memory/resource limitations.

A video stream is a series of pictures. In MPEG, some of the pictures are complete pictures (I frames) that can be reconstructed without reference to another frame, while other frames cannot be fully reconstructed (B frames and P frames) without referencing one or more other frames. Decoding and processing these frames can require significant memory and/or resources. When a system or device such as a set top box does not have sufficient memory and/or processing strength to decode and process all the frames of a video stream, only certain frames of the video stream are processed and displayed. In one example, only I frames are processed and displayed.

Because only certain frames are being processed and displayed, the memory and/or resource requirements of the video stream are reduced. Reducing the memory/resource requirements of the video stream enables the system to continue displaying at least a portion of the video stream instead of simply suppressing the entire video stream. The actual frames being processed and displayed can vary according to system resource availability. For example, the system may process and display every I frame of the video stream or the system may process and display selected I frames. In this manner, the video stream is gracefully degraded and is not suppressed.

Another aspect of the present invention relates to accommodating the bandwidth of the system or set top box. When a video stream is requested by a set top box, either from an origination server or a proxy server, the set top box negotiates how the video stream is delivered according to the available bandwidth of the connection. This enables the set top box, for example, to request the I frames of a video stream that could not otherwise be delivered over the available bandwidth. This presents several options to the set top box when multiple versions of a video stream are available. The set top box can request certain frames from a high resolution version of the video stream or request all frames of a low resolution version of the video stream.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

One of the advantages of a system or a device such as a set top box is the ability to display video to a user. If the video connection of the set top box is unable to accommodate the bandwidth required by a particular video stream or if the set top box does not have sufficient resources to decode and process the video stream, then the video stream is often suppressed and the user is unable to view the video stream. In other words, the ability of a set top box to display streaming video is often dependent on the connection speed or bandwidth and the memory/resoures of the set top box.

The present invention addresses these and other issues by providing systems, methods, and computer program products for allowing a video stream to be displayed in spite of limited bandwidth and/or limited memory/resources by displaying certain frames of the video stream when these types of situations are detected. A system or set top box thus displays a portion of the video stream instead of suppressing the video stream. This is accomplished, for example, by only displaying some of the frames that are included in the video stream. The number of frames displayed can vary and may be determined dynamically based on the video stream rate, the actual connection of the set top box, and the availability of the memory/resources of the set top box.

Figure 1:
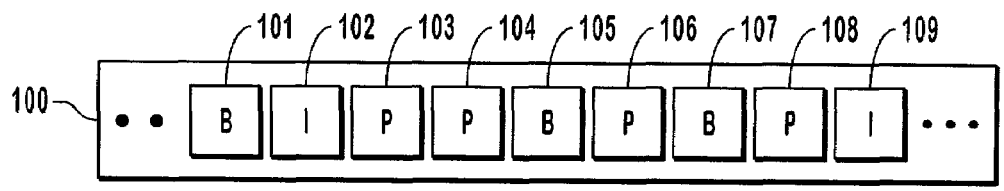
FIG. 1 illustrates a picture level of an exemplary video stream including intra frames, predictive frames, and bi-directional frames.

FIG. 1 is a block diagram that illustrates an exemplary picture level of a video stream. In this example, the video stream 100 is comprised of multiple frames or pictures and each frame includes data that is used to generate a picture. The video stream 100 includes one or more frames including, but not limited to, initialization frames (intraframes or I frames), frames that allow bi-directional prediction (B frames), and predictive frames (P frames). I frames are typically larger than B frames and P frames because they contain an entire picture and do not require the set top box to access a reference frame in order to decode and display the picture. B frames and P frames, on the other hand, require the system to maintain one or more reference frames in the system memory in order to render the complete image. By using B frames and P frames, however, a video stream can be significantly compressed.

The I frames 102 and 109 thus contain complete data that corresponds to an entire picture or frame. P frames, such as P frames 103, 104, 106, and 108 are typically not a complete picture, but contain, for instance, motion vectors that are used to obtain some of the picture data from reference frames. The video stream 100 of FIG. 1 illustrates a series of frames where the first illustrated frame being a B frame 101. The series continues with an I frame 102, a P frame 103, a P frame 104, a B frame 105, a P frame 106, a B frame 107, a P frame 108, and an I frame 109.

The use of P frames and B frames, however, gradually introduces errors that are related to the prediction. For at least this reason, new I frames are often sent in the video stream to provide a new starting point for B frames and P frames and to limit the amount of errors that occur through interframe coding. Because I frames are sent regularly and contain an entire picture, only I frames are displayed to the user in one example of the present invention. The memory and processing requirements associated with B frames and P frames are therefore reduced or eliminated.

From the video stream 100, the need for system memory/resources can be significant. A memory buffer is required to store a reference frame for each P frame in the video stream 100. Two memory buffers are required for some of the B frames. In addition, a screen buffer may be required in order to store the data that is sent to the display device. If the video stream is a high resolution video stream, it is possible that a device that is decoding and displaying the video stream will not have sufficient memory/resources to decode the video stream or satisfy the buffer requirements of the video stream 100. In this instance, the video stream 100, as previously described, is suppressed. Alternatively, the bandwidth requirements of the video stream 100 may preclude the rendering client from processing and displaying the video stream 100.

Figure 2:
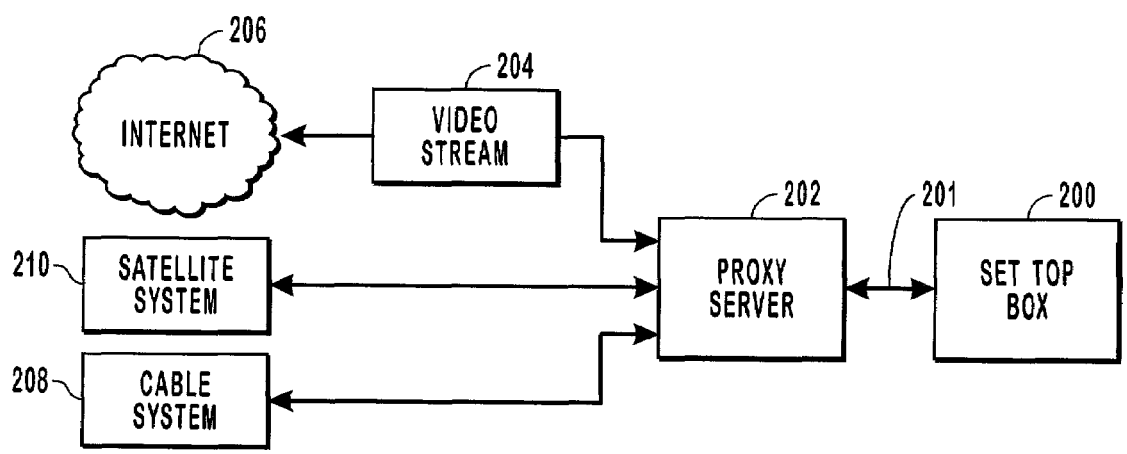
FIG. 2 is a block diagram illustrating exemplary sources that provide content such as video streams to a set top box.

FIG. 2 is a block diagram that illustrates exemplary sources of content, including video streams, that is delivered to a set top box. FIG. 2 illustrates a client or device such as a set top box that is capable of receiving content from multiple sources including, but not limited to, the Internet 206, a cable system 208, and a satellite system 210. The set top box 200 is an exemplary computing device that has the capability to receive content from a source and to decode and display video streams. Exemplary set top boxes include, but are not limited to, Internet terminals, satellite receivers, cable boxes, digital video recorders, DSS/DVD, and the like or any combination thereof. The content received by the set top box 200 includes, but is not limited to, television programs, streaming video/audio, MPEG streams, image data, text data, and the like and combinations thereof. As illustrated in this example, the content received by the set top box 200 is often received through a proxy server 202. However, the set top box 200 is able to receive content independent of the proxy server 202.

In this example of FIG. 2, the set top box 200 receives a video stream 204 (including audio) from the Internet 206 (although video streams can be received from other sources as well). The video stream 204 is often directed to the set top box 200 through a proxy server 202. As previously described, one of the limitations faced by the set top box 200 is related to the connection 201 of the set top box 200 and the proxy server 202 or, alternatively, with the Internet 206 or other network. The connection 201 often has bandwidth limitations that have an effect on the content or data being received by the set top box 200. The set top box 200 may also have hardware limitations such as modem speed or memory (RAM) constraints that place limits on the amount of data that can be efficiently processed by the set top box 200. One advantage of the present invention is the ability to overcome these situations in some circumstances.

The present invention permits a video stream to be displayed by a set top box by addressing these limitations. With respect to limited memory/resources, the set top box only decodes and processes certain key frames. The other frames of the video stream are simply discarded and not processed. In the case where the key frames are I frames, many of the buffer requirements imposed by B frames and P frames are eliminated because an I frame does not require the set top box to reference another frame of the video stream. By processing and displaying only the key frames, the user is able to view the key frames. The frames that are actually displayed to the user can be adjusted as the state of the set top box's memory/resources changes.

With respect to the bandwidth, the present invention permits the set top box to negotiate with the proxy server or other server such that only the key frames are sent or downloaded to the set top box. This can reduce the bandwidth requirements of the video stream and permit some devices to display at least a portion of the video stream. The frames that are delivered to the set top box can change as the bandwidth availability is monitored. This enables the set top box to adapt the frames that are displayed to resource and bandwidth availability.

Figure 3:
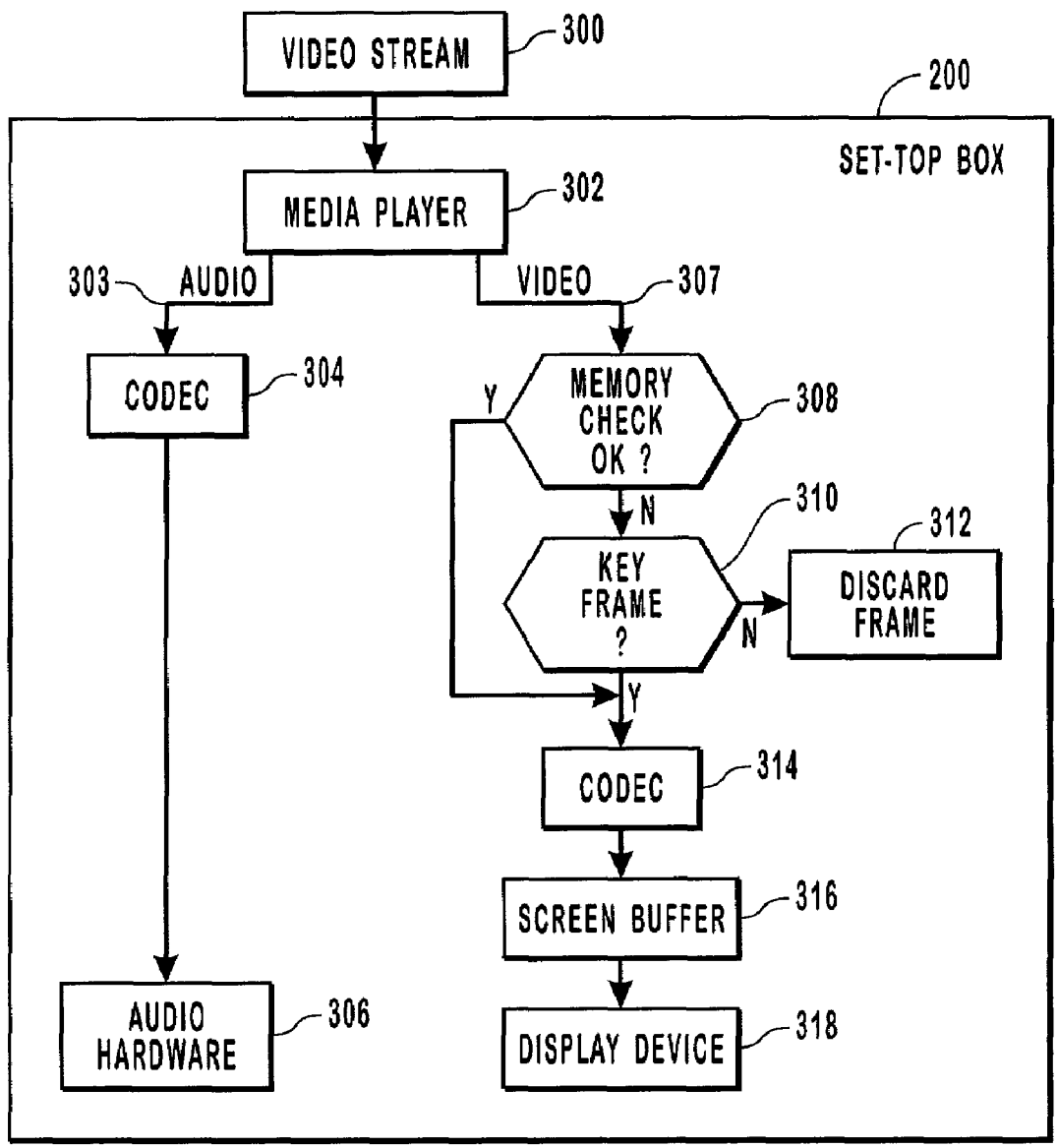
FIG. 3 illustrates an exemplary method for displaying key frames included in a video stream.

FIG. 3 is a flow diagram illustrating an exemplary method for displaying a video stream when the system resources are limiting the ability of the set top box to display the video stream. When a video stream 300 arrives at a set top box 200 or other system, the video stream 300 is often compressed. In this case, the video stream 300 is received at a media player 302, which has the ability to decompress and process the video stream 300. The media player 302 is able to separate the video stream 300 into an audio component 303 and a video component 307. The audio component is directed to a codec 304, which decodes the audio component 303. After the audio component is decoded, the audio component is provided to audio hardware 306, which renders the audio for the user.

The video component 307 has much more data than the audio component and requires more processing before it can be displayed on the display device. For instance, processing a video stream often requires several buffers in memory that are used with B frames and P frames. In addition, processing a video stream requires motion tables to account for interframe motion. Thus, as previously described, the memory requirements for processing a video stream can be significant in any given system. If the memory is insufficient for a given video stream, then the video stream, in the absence of the present invention, is typically suppressed as previously described.

In this example, the memory of the system is first checked (308) to ensure that the system has sufficient memory to process the video stream. In fact, the memory is repeatedly checked as the video stream is processed such that the set top box 200 can begin to display key frames when the memory or other resources are low. By monitoring the memory or resources of the set top box, the set top box 200 can identify when the memory or resources of the set top box are not sufficient to continue decoding and processing the entire video stream.

If the memory of the system is insufficient as determined at 308 then the video component 307 of the video stream is examined for key frames (310). If the frame being examined is a key frame, then it is decoded by the codec 314 and displayed on the display device 318. If the frame being examined is not a key frame, then the frame is simply discarded (312). By discarding frames that are not key frames, less memory is required to decode and process the video component. Identifying a frame as an I frame, a P frame, or a B frame is known in the art.

In this situation where some of the frames of the video component are being discarded, then only the key frames are displayed to the user. In one example, the key frames are the I frames because each I frame corresponds to an entire picture and the set top box does not need to store a reference frame in order to generate the frame for display. In some situations, some of the I frames are also discarded due to system/bandwidth constraints. The video presented to the user on the display device may include each I frame or less than all of the I frames of a video stream. As the available memory of the system changes, then it is possible for the system to resume displaying all frames to the user on the display device 318. In other words, the system resources determine, in part, how the video component is processed and displayed.

In another example, the key frames are I frames and P frames. This eliminates the second buffer that is required by B frames. Also, the present invention is not required to process and display all of the I frames and P frames of the video stream. The frames that are actually processed and displayed are dependent on the availability of the resources and memory of the set top box. Thus the video frame may change from, for example, displaying every frame to the user to displaying only the I frames. One advantage is that a user is always able to view at least a portion of the video stream.

If the system or set top box 200 has sufficient memory and if the bandwidth is not a concern, then the video component 307 is directed to the codec 314, where the video stream is decoded. The output of the codec 314 is ultimately directed to a screen buffer 316 and displayed on the display device 318. The screen buffer 316 typically contains the information to be displayed on the display device.

Thus, when a client such as a set top box is decoding and displaying a video stream, the client is continually checking or monitoring the available memory and/or resources of the client. If the memory and/or the resources fall below a minimum threshold and are not sufficient to continue decoding and processing the video stream, then minimum decoding of the video stream is implemented. Only buffers for key frames, for example, are allocated for decompressing the key frames and only key frames are displayed on a display device.

Figure 4:
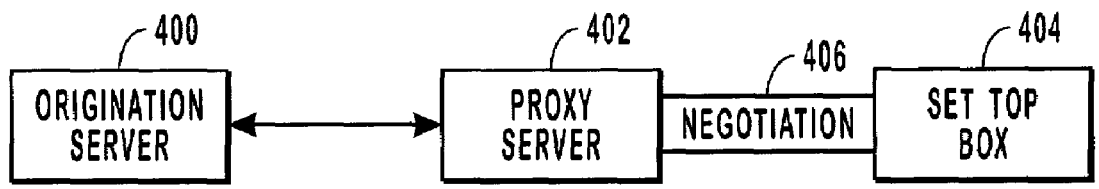
FIG. 4 is a block diagram to illustrate a negotiation between a set to box and a server such that only certain frames are streamed to the set top box because of bandwidth restrictions or resource limitations of a set top box.

FIG. 4 is a block diagram that illustrates a set top box that is receiving a video stream from an origination server. FIG. 4 illustrates that the set top box 404 receives the video stream through a proxy server 402, but it is understood that the set top box 404 can receive the video stream directly from the origination server 400. Thus the negotiation 406 that occurs between the set top box 402 and the proxy server 402, as described below, can also occur between the origination server 400 and the set top box 404.

When the set top box 404 or other client determines that the video stream has a higher bandwidth than what the connection between the set top box 404 and the proxy server 402 can support, the set top box 404 can communicate with the proxy server 402 and negotiate (406) how the video stream is downloaded over the connection. The set top box 404, for example, assesses the bandwidth of the connection and the memory of the set top box before selecting a video stream. In one example, a user may select the high bandwidth video stream on the assumption that only certain frames will be downloaded to the set top box.

During negotiation 406 with the proxy server 402, the set top box 404 requests that the proxy server 402 only transmit key frames of the video stream. Because the proxy server 402 is only sending key frames, the bandwidth requirement of the video stream is reduced. In addition, the amount of data that is handled by the set top box 404 is also reduced. This allows the set top box 404 to decode, process and display key frames for video streams that have a higher bandwidth requirement than what the connection of the set top box 404 could normally accommodate.

The set top box 404 also has the ability to continually update the proxy server 402 regarding the video stream. The set top box 404 can specify a key frame frequency as well as update the key frame frequency as the conditions of the connection between the proxy server 402 and the set top box 404 change. In this manner, the frequency of the key frames being displayed may be dynamically determined according to the video stream rate, the availability of set top box resources, and connection throughput, for example.

Figure 5:
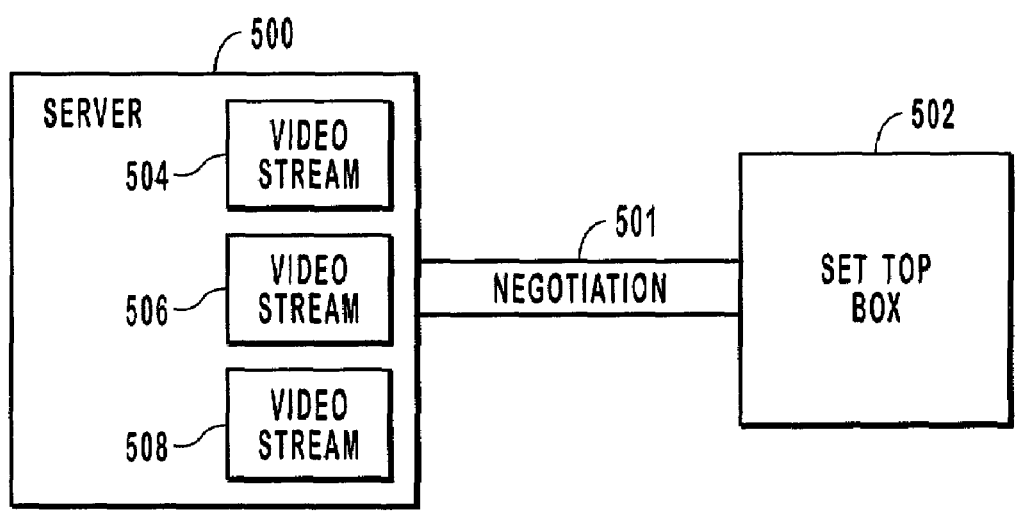
FIG. 5 is a block diagram illustrating the negotiation between a set top box and a server where a set top box can receive key frames from different video streams according to bandwidth restrictions.

FIG. 5 is a block diagram illustrating an example of a set top box that negotiates with a server in order to view a video stream. The server 500 provides, in this example, three versions of a video stream. Each video stream has a different resolution and is designed for certain connection speeds or bandwidths. Thus, the video stream 504 has a higher bandwidth requirement than the video streams 505 and 508. The video stream 504 has a bandwidth requirement that is greater than the video stream 508.

When the set top box 502 requests a video stream from the server 500, a negotiation 501 may occur. If, for example, the connection between the set top box 502 and the server 500 will only support the bandwidth requirements of the video stream 508, then the set top box 502 can negotiate with the server 500 such that only key frames from the video stream 506 or 504 are streamed to the set top box 502. Thus, the set top box is able to stream key frames of a higher resolution video stream.

In another example, the negotiation 501 may depend on the resources of the set top box 502. For example, the connection between the server 500 and the set top box 502 may support the bandwidth requirements of the video stream 506. The processing capability of the set top box 502, however, may only support the video stream 508. In this instance, the set top box 502 may request either the video stream 508 or the set top box 502 may request only key frames from the video stream 506 or 508.

Another advantage of the present invention is that the set top box 502 can switch to a different stream. For example, if the set top box is receiving key frames from the video stream 506, it is possible that the connection and/or the resources of the set top box 502 may create a situation where the set top box cannot handle the key frames of the video stream 506. In this case, the set top box 502 negotiates with the server 506 to stream either the video stream 508 or key frames of the video stream 508. Another advantage of the present invention is that the video stream is gracefully degraded instead of being suppressed. Also, the user may be able to view some of the frames at a higher resolution that could otherwise be accommodated.

The present invention extends to both methods and systems for displaying a video stream or for displaying selected frames of a video stream. The embodiments of the present invention may comprise a special-purpose or general-purpose computer including various computer hardware, as discussed in greater detail below. The set top boxes described herein represent examples of such special-purpose computers.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise computer storage media and communication media. Computer storage media comprises RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a communication medium. Thus, any such connection is properly termed a communication medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 6:
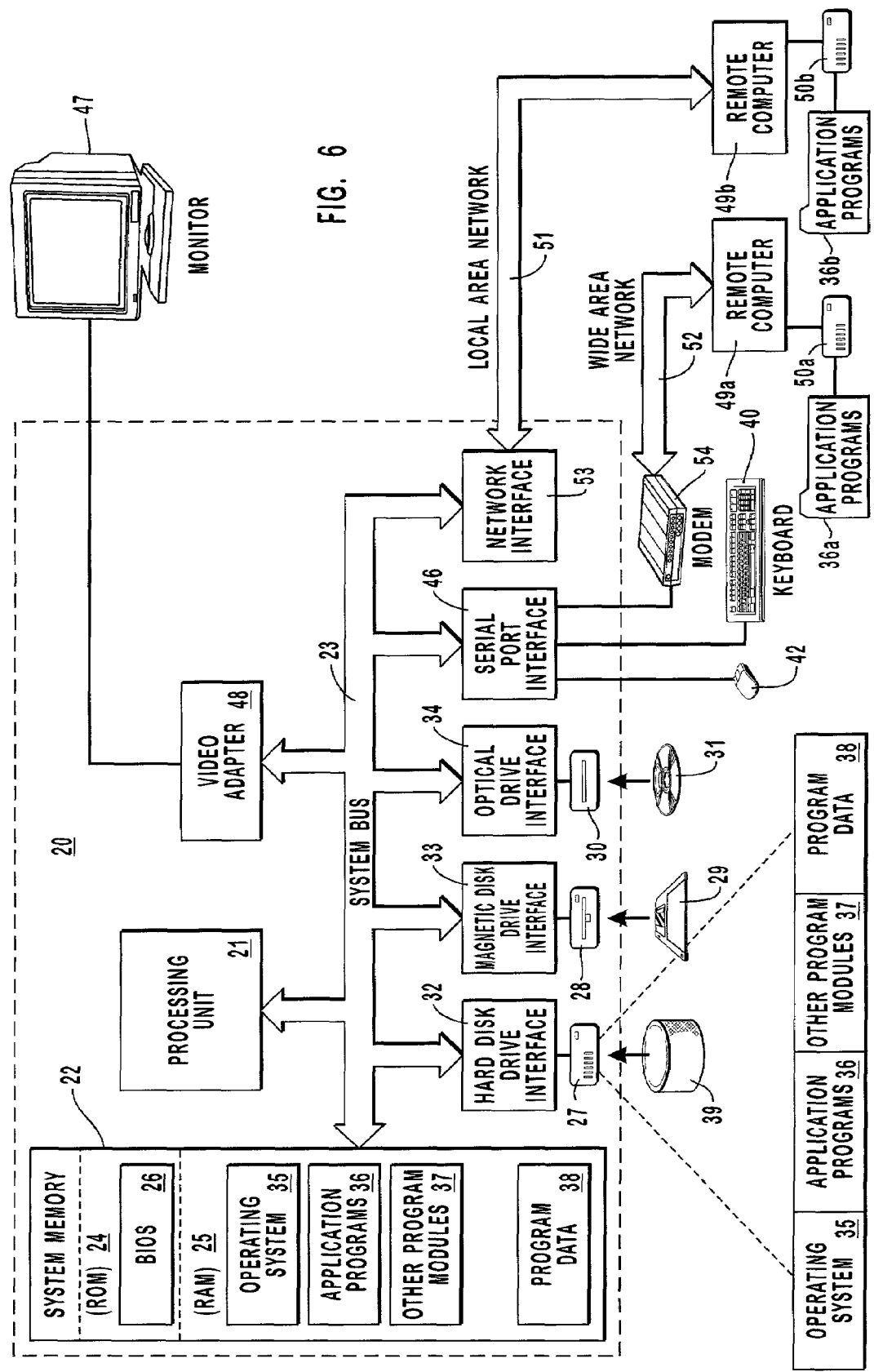
FIG. 6 illustrates an exemplary system that provides a suitable operating environment for the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 6. The logical connections depicted in FIG. 6 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system including a client that has a connection with a server, wherein the connection has a bandwidth and wherein the client has a memory, a method for displaying a video stream without suppressing the video stream, the method comprising:

the client connecting with the server to select and receive a first video stream, wherein the server stores the first video stream and a second video stream in the MPEG format, wherein the first video stream has a resolution that is higher than the second video stream such that more memory and resources are required to decode and process the first video stream than the second video stream;

the client decoding and processing the first video stream received by the client from the server, wherein memory and resources of the client are required to decode and process the first video stream;

the client monitoring the memory and resources of the client as the first video stream is decoded and processed to ensure that the client has sufficient memory and resources to decode and process the first video stream;

upon the client determining that the client lacks sufficient memory and resources to decode and process the first video stream, the client requesting that the server transmit only specified key frames of the first MPEG video stream, the key frames consisting of either (a) intra frames or (b) intra frames and predictive frames of the first MPEG video stream, wherein the client request to transit only specified key frames causes the server to determine, for each frame in the first video stream, whether a frame in the first video stream is one of the specified key frames and which further causes the server to transmit the frame to the client when it is determined that the frame is one of the specified key frames and to drop the frame from the first video stream being transmitted to the client when it is determined that the frame is not one of the specified key frames; and upon the client determining that the client lacks sufficient memory and resources to decode and process the specified key frames of the first video stream, the client requesting that the server transmit the second video stream, wherein less memory and resources are required to decode and process the second video stream than the key frames of the first video stream.

2. A method as defined in claim 1, wherein the specified key frames consist of all of the intra frames and some of the predictive frames in the video stream.

3. In a system that receives a video stream from a server over a connection that has a connection bandwidth, a method for displaying the video stream when the video stream requires more bandwidth than connection bandwidth, the method comprising:
- a client connecting with the server to select and receive a first video stream in the MPEG format, wherein the video stream is available in one or more versions and wherein each version requires a different bandwidth, wherein the server also stores a second video stream in the MPEG format, wherein the first video stream is of a first version and the second video stream is of a second version, the first version requiring more bandwidth than the second version;
- after receiving a portion of the first video stream and upon the client determining that the connection bandwidth is insufficient to support the bandwidth required by the first video stream, the client requesting that the server transmit only specified key frames of the first MPEG video stream, the key frames consisting of either (a) intra frames or (b) intra frames and predictive frames of the first MPEG video stream, wherein the client request to transit only specified key frames causes the server to determine, for each frame in the first video stream, whether a frame in the first video stream is one of the specified key frames and which further causes the server to transmit the frame to the client when it is determined that the frame is one of the specified key frames and to drop the frame from the first video stream being transmitted to the client when it is determined that the frame is not one of the specified key frames; and
- upon the client determining that the connection bandwidth is insufficient to support the bandwidth required by the specified key frames of the first video stream, the client requesting that the server transmit the second video stream, wherein the second video stream requires less bandwidth than the specified key frames of the first video stream.

4. A method as defined in claim 3, wherein the client is a set top box and further comprising assessing available memory of the set top box, wherein the available memory of the set top box affects which version of the video stream is selected by the set top box.

5. A method as defined in claim 3, wherein the client makes an additional request for specified key frames if the connection bandwidth changes.

6. A method as defined in claim 5, wherein making an additional request for specified key frames further comprises:
- the client monitoring the connection bandwidth; and
- the client requesting specified key frames such that the frames downloaded to the client depend on how much connection bandwidth is available.

7. A computer program product for use in a system that receives a video stream from a server over a connection that has a connection bandwidth, the computer program product for implementing a method for displaying the video stream when the video stream requires more bandwidth than connection bandwidth, the computer program product comprising:
- a computer storage medium having stored computer executable instructions for performing the method, the method comprising:
  - a client connecting with the server to select and receive a first video stream in the MPEG format, wherein the video stream is available in one or more versions and wherein each version requires a different bandwidth, wherein the server also stores a second video stream in the MPEG format, wherein the first video stream is of a first version and the second video stream is of a second version, the first version requiring more bandwidth than the second version;
  - after receiving a portion of the first video stream and upon the client determining that the connection bandwidth is insufficient to support the bandwidth required by the first video stream, the client requesting that the server transmit only specified key frames of the first MPEG video stream, the key frames consisting of either (a) intra frames or (b) intra frames and predictive frames of the first MPEG video stream, wherein the client request to transit only specified key frames causes the server to determine, for each frame in the first video stream, whether a frame in the first video stream is one of the specified key frames and which further causes the server to transmit the frame to the client when it is determined that the frame is one of the specified key frames and to drop the frame from the first video stream being transmitted to the client when it is determined that the frame is not one of the specified key frames; and
  - upon the client determining that the connection bandwidth is insufficient to support the bandwidth required by the specified key frames of the first video stream, the client requesting that the server transmit the second video stream, wherein the second video stream requires less bandwidth than the specified key frames of the first video stream.

8. A computer program product as defined in claim 7, wherein the client is a set top box and further comprising assessing available memory of the set top box, wherein the available memory of the set top box affects which version of the video stream is selected by the set top box.

9. A computer program product as defined in claim 7, wherein the client makes an additional request for specified key frames if the connection bandwidth changes.

10. A computer program product as defined in claim 9, wherein making an additional request for specified key frames further comprises:
- the client monitoring the connection bandwidth; and
- the client requesting key frames such that the frames downloaded to the client depend on how much connection bandwidth is available.

11. A computer program product for use in a system including a client that has a connection with a server, wherein the connection has a bandwidth and wherein the client has a memory, the computer program product for implementing a method for displaying a video stream without suppressing the video stream, the computer program product comprising:
- a computer storage medium having stored computer executable instructions for performing the method, the method comprising:
  - the client connecting with the server to select and receive a first video stream, wherein the server stores the first video stream and a second video stream in the MPEG format, wherein the first video stream has a resolution that is higher than the second video stream such that more memory and resources are required to decode and process the first video stream than the second video stream;
  - the client decoding and processing the first video stream received by the client from the server, wherein memory and resources of the client are required to decode and process the first video stream;

the client monitoring the memory and resources of the client as the first video stream is decoded and processed to ensure that the client has sufficient memory and resources to decode and process the first video stream;

upon the client determining that the client lacks sufficient memory and resources to decode and process the first video stream, the client requesting that the server transmit only specified key frames of the first MPEG video stream, the key frames consisting of either (a) intra frames or (b) intra frames and predictive frames of the first MPEG video stream, wherein the client request to transit only specified key frames causes the server to determine, for each frame in the first video stream, whether a frame in the first video stream is one of the specified key frames and which further causes the server to transmit the frame to the client when it is determined that the frame is one of the specified key frames and to drop the frame from the first video stream being transmitted to the client when it is determined that the frame is not one of the specified key frames; and upon the client determining that the client lacks sufficient memory and resources to decode and process the specified key frames of the first video stream, the client requesting that the server transmit the second video stream, wherein less memory and resources are required to decode and process the second video stream than the key frames of the first video stream.

12. A computer program product as defined in claim 11, wherein the specified key frames consist of all of the intra frames and some of the predictive frames in the video stream.

* * * * *